United States Patent
Vasquez

(10) Patent No.: US 10,280,352 B2
(45) Date of Patent: May 7, 2019

(54) WATER SWELLABLE POLYMER AS A DIVERTER FOR ACID STIMULATION TREATMENTS IN HIGH TEMPERATURE ENVIRONMENTS

(71) Applicant: Halliburton Energy Services, Inc., Houston, TX (US)

(72) Inventor: Julio Vasquez, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 42 days.

(21) Appl. No.: 15/527,248

(22) PCT Filed: Dec. 23, 2014

(86) PCT No.: PCT/US2014/072139
§ 371 (c)(1),
(2) Date: May 16, 2017

(87) PCT Pub. No.: WO2016/105382
PCT Pub. Date: Jun. 30, 2016

(65) Prior Publication Data
US 2017/0342307 A1 Nov. 30, 2017

(51) Int. Cl.
| | | |
|---|---|---|
| *C09K 8/86* | (2006.01) | |
| *C09K 8/035* | (2006.01) | |
| *E21B 43/16* | (2006.01) | |
| *C09K 8/516* | (2006.01) | |
| *C09K 8/536* | (2006.01) | |
| *C09K 8/70* | (2006.01) | |
| *C09K 8/92* | (2006.01) | |

(52) U.S. Cl.
CPC ............. *C09K 8/035* (2013.01); *C09K 8/516* (2013.01); *C09K 8/536* (2013.01); *C09K 8/70* (2013.01); *C09K 8/92* (2013.01); *E21B 43/16* (2013.01)

(58) Field of Classification Search
CPC . C09K 8/805; C09K 8/80; C09K 8/62; C09K 8/685; C09K 3/22; C09K 8/38; C09K 8/40; C09K 8/42; C09K 8/50; C09K 8/516; C09K 8/518; C09K 8/528; C09K 8/536; C09K 8/57; C09K 8/5751; C09K 8/5758; C09K 8/58; C09K 8/72; C09K 8/845; C09K 8/86; C09K 8/88; C09K 8/90; C09K 8/92; C09K 8/94; E21B 43/24; E21B 43/243; E21B 29/02; E21B 36/001; E21B 43/16; E21B 43/30; E21B 10/003; E21B 17/028; E21B 19/08; E21B 21/00; E21B 21/08; E21B 23/01; E21B 33/134; E21B 36/02; E21B 3/00; E21B 43/119; E21B 43/2403; E21B 43/2405; E21B 43/281; E21B 43/305; E21B 44/02; E21B 47/022

See application file for complete search history.

(56) References Cited

U.S. PATENT DOCUMENTS

| | | | |
|---|---|---|---|
| 6,889,766 B2 | 5/2005 | Creel et al. | |
| 8,016,034 B2 | 9/2011 | Glasbergen et al. | |
| 2003/0101912 A1 | 6/2003 | Brothers et al. | |
| 2009/0221452 A1 | 9/2009 | Whitfill et al. | |
| 2009/0294126 A1 | 12/2009 | Dalrymple et al. | |
| 2010/0089581 A1* | 4/2010 | Nguyen | C09K 8/685 166/280.2 |
| 2010/0292109 A1 | 11/2010 | Moradi-Araghi et al. | |
| 2014/0116702 A1 | 5/2014 | Tang | |
| 2016/0009985 A1* | 1/2016 | Brennan | C09K 8/685 507/211 |

FOREIGN PATENT DOCUMENTS

CN 102191023 * 9/2011

OTHER PUBLICATIONS

International Preliminary Report on Patentability issued in related Application No. PCT/US2014/072139, dated Jul. 6, 2017 (13 pages).
Vasquez, Julio Estuardo, et al. "Laboratory evaluation of water swellable materials for fracture shutoff." SPE North Africa Technical Conference & Exhibition. Society of Petroleum Engineers, 2008.
International Search Report and Written Opinion issued in related PCT Application No. PCT/US2014/072139 dated Sep. 16, 2015, 16 pages.

* cited by examiner

*Primary Examiner* — Kumar R Bhushan
(74) *Attorney, Agent, or Firm* — Thomas Rooney; Baker Botts L.L.P.

(57) ABSTRACT

Methods for diverting treatment fluids to less permeable zones of subterranean formations using a water swellable agent that can degrade at high temperatures are provided. In one embodiment, the method may comprise introducing a water swellable agent into or adjacent to a permeable zone of a subterranean formation; introducing an aqueous solution into the subterranean formation to contact the water swellable agent; allowing the water swellable agent to swell when contacted by the aqueous solution; introducing a treatment fluid into the subterranean formation, wherein the water swellable agent diverts the treatment fluid away from the permeable zone; and allowing the water swellable agent to thermally degrade.

11 Claims, 1 Drawing Sheet

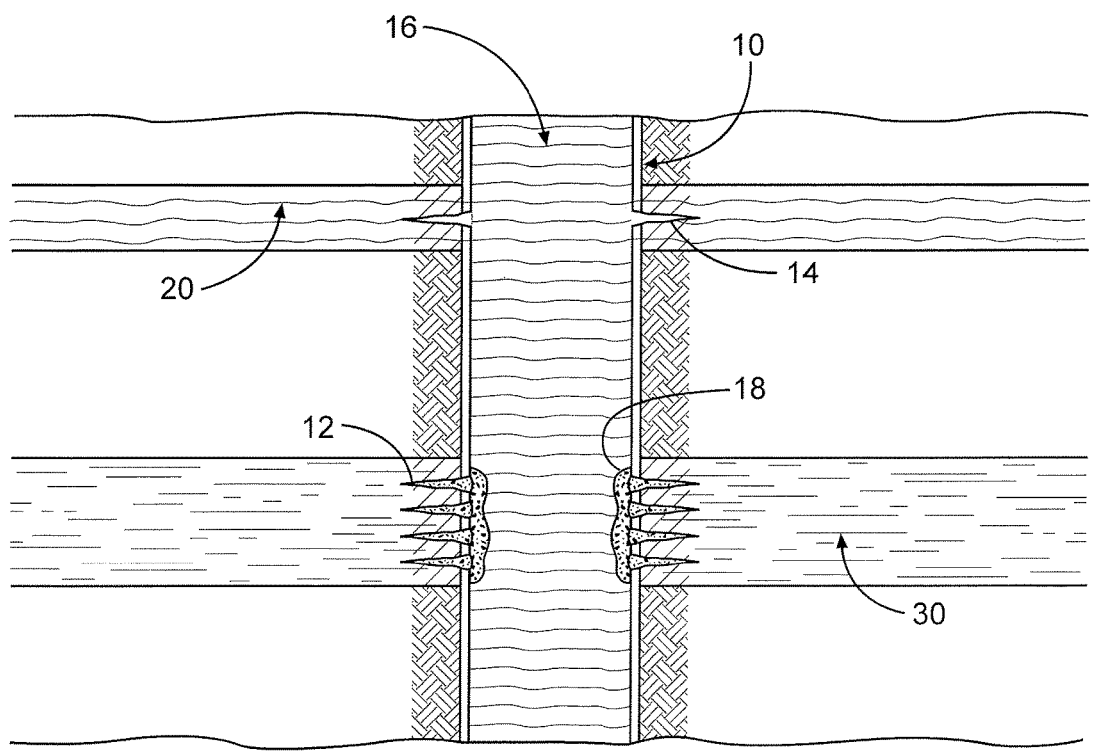

WATER SWELLABLE POLYMER AS A DIVERTER FOR ACID STIMULATION TREATMENTS IN HIGH TEMPERATURE ENVIRONMENTS

CROSS-REFERENCE TO RELATED APPLICATION

The present application is a U.S. National Stage Application of International Application No. PCT/US2014/072139 filed Dec. 23, 2014, which is incorporated herein by reference in its entirety for all purposes.

BACKGROUND

The present disclosure relates to methods for treating subterranean formations by diverting treatment fluids therein.

Hydrocarbons (e.g., oil or gas) residing in subterranean formations may be recovered by driving resources from the formation into a well bore using, for example, a pressure gradient that exists between the formation and the well bore, the force of gravity, displacement of the hydrocarbons from the formation using a pump or the force of another fluid injected into the well or an adjacent well.

Production of hydrocarbons from well bores tends to decrease over time in part due to gradual decreasing formation permeability in the vicinity of the well bore. To provide for the production of more hydrocarbons, it is a common practice to stimulate subterranean formations with treatment fluids in order to increase the permeability thereof. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Formation acidizing, or "acidizing," is a stimulation method for increasing the flow of desirable hydrocarbons from a subterranean formation using an acidic treatment fluid. In typical stimulation operations of subterranean formations, stimulation treatments may be performed in multiple stages. These multiple stage treatments may be performed simultaneously, but the multiple stage stimulation treatments may be performed sequentially. Multiple stage treatments are especially desirable when well bores are completed in multi-zones that have high permeability contrast. In each stage, it is often desirable to divert the stimulation treatment fluids away from more permeable zones, causing the stimulation treatment fluid to be diverted to less permeable zones of the formation.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a subterranean formation penetrated by a well bore in which a treatment fluid may be diverted from one permeable zone to another permeable zone using a water swellable agent of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for treating subterranean formations by diverting treatment fluids therein. More particularly, the present disclosure relates to methods for diverting treatment fluids to less permeable zones of subterranean formations using a water swellable agent that can degrade at high temperatures. As used herein, the term "permeable zone" refers to a distinct part of a well bore designated for treatment and/or production that can be permeated or penetrated by liquids or gases, including, but not limited to, fractures and fissures in the subterranean formation, both naturally occurring and artificially created.

The present disclosure provides methods for diverting treatment fluids to less permeable zones of subterranean formations by introducing a water swellable agent into or adjacent to more permeable zones of the formation. In the methods of the present disclosure, a water swellable agent may be introduced into or adjacent to at least a portion of a permeable zone of a subterranean formation. An aqueous solution may also be introduced into the subterranean formation to contact the water swellable agent and to allow the water swellable agent to swell. The water swellable agent may be combined with a carrier fluid or the aqueous solution before being introduced into the subterranean formation. A treatment fluid may then be introduced into the subterranean formation and may be diverted away from the permeable zone by the water swellable agent to a less permeable zone of the subterranean formation. In certain embodiments, the water swellable agent may thermally degrade over time after diverting the treatment fluid.

Existing means for diverting treatment fluids in subterranean formations often require secondary cleanup operations to remove the diverting material after diverting of the treatment fluid is complete so as to allow the maximum flow of produced fluids that comprise hydrocarbons from the subterranean formation into the well bore. As used herein, "secondary cleanup operations" may include, but are not limited to, physical removal of mechanical diverting materials (e.g., ball sealers) and chemical removal of diverting materials (e.g., polymers, foams) by introducing degradation agents into the subterranean formation.

Among the many potential advantages to the methods of the present disclosure, only some of which are alluded to herein, the methods of the present disclosure may allow for more effective diversion of treatment fluids, especially in subterranean formations having downhole temperatures above 250° F., by eliminating the need for secondary cleanup operations to recover or to otherwise remove the diverting material from the well bore. Such clean-up activity delays, complicates, and adds expense to the well treatment process, and certain embodiments of the present disclosure may avoid these issues. In certain embodiments, the methods of the present disclosure may permit a water swellable agent used to divert a treatment fluid to degrade under natural conditions of the subterranean formation, and may thus eliminate the need to introduce degradation agents into the subterranean formation.

The water swellable agents that may be useful in accordance with the present disclosure may be any suitable material that absorbs an aqueous solution, swells (i.e., expands) as it absorbs the aqueous solution, and degrades over time at a temperature around about 250° F. or above. In certain embodiments, the water swellable agent may be hydrophilic and thus may be physically attracted to water molecules. In certain embodiments, the water swellable agent may be insoluble in water or other treatment fluids and thus may avoid becoming diluted and washed away by water or other treatment fluids flowing through the subterranean formation.

Examples of suitable water swellable agents include, but are not limited to, polyacrylamides. In certain embodiments, the water swellable agent may be a crystalline polymer that has been dehydrated. In certain embodiments, the water swellable agent may be a crosslinked polyacrylamide. In certain embodiments, the water swellable agent may be a crosslinked polyacrylamide in the form of a hard crystal. One example of a suitable commercially available water swellable agent is CrystalSeal®, available from Halliburton Energy Services, Inc., Houston, Tex.

In certain embodiments, the water swellable agent may be introduced into a subterranean formation in an effective amount for plugging or partially plugging a permeable zone in the subterranean formation. In certain embodiments, the water swellable agent may form a gel mass upon swelling, which may block a flow path of fluid through at least a portion of the more permeable zone. As used herein, the term "gel mass" refers to a crosslinked polymer network in an aqueous-based fluid. In certain embodiments, the gel mass may have a relatively low permeability to water and/or other treatment fluids. In certain embodiments, the gel mass may create a barrier to the flow of water and/or other treatment fluids in the zone containing the water swellable agent. In certain embodiments, the gel mass can plug permeable zones in the subterranean formation because it can withstand substantial amounts of pressure without being dislodged or extruded. In certain embodiments, the gel mass may be resistant to deterioration by carbon dioxide, bacteria, and/or subterranean minerals. In certain embodiments, the gel mass may withstand temperatures up to about 250° F. without experiencing significant breakdown.

In certain embodiments, the particle size of the water swellable agent may be an effective particle size so that the water swellable agent will not enter the matrix or pore spaces of the rock present in a subterranean formation. In certain embodiments, the particle size of the water swellable agent may be an effective particle size so that the water swellable agent will enter fractures and fissures, both naturally occurring and artificially created, within the permeable zone. In certain embodiments, the particle size of the water swellable agent may be from about 0.04 mm to about 4 mm. In other embodiments, the particle size of the water swellable agent may be from about 0.04 mm to about 1 mm, in other embodiments, about 1 mm to about 2 mm, in other embodiments, about 2 mm to about 3 mm, and in other embodiments, about 3 mm to about 4 mm.

In certain embodiments, the water swellable agent may be contacted with an aqueous solution and may swell as it absorbs the aqueous solution. In certain embodiments, as the water swellable agent undergoes hydration, its volume may increase by about 10 times to about 400 times its original volume. As would be appreciated by those of ordinary skill in the art with the benefit of this disclosure, the amount and rate by which the water swellable agent increases in volume may vary depending upon its grain size and the ionic strength of a carrier fluid used to introduce the water swellable agent into a subterranean formation. In certain embodiments, the rate of swelling of the water swellable agent also may increase as the grain size of the water swellable agent decreases and as the ionic strength of the carrier fluid decreases.

In certain embodiments, the water swellable agent may comprise a degradable material that may undergo irreversible degradation downhole. As used herein, the term "irreversible degradation" refers to conversion of the material into simpler compounds that do not retain all the characteristics of the starting material and that do not recrystallize or reconsolidate while downhole.

In certain embodiments, the water swellable agent may irreversible degrade so as to allow maximum flow of produced fluids that comprise hydrocarbons from the permeable zone into the well bore. In certain embodiments, the water swellable agent may irreversibly degrade into liquid that may be produced back to the surface. In certain embodiments, once irreversibly degraded, the water swellable agent may be removed from the permeable zone to at least partially unplug the permeable zone without performing any secondary cleanup operations. In certain embodiments, the degradation of the water swellable agent of the present disclosure may occur over a period of time under downhole conditions as a result of the subterranean environment (e.g., temperature, pressure, pH, water content, etc.).

In certain embodiments, degradation of the water swellable agent of the present disclosure may occur at a downhole temperature of the subterranean formation of from about 250° F. to about 350° F. In other embodiments, degradation of the water swellable agent of the present disclosure may occur at a downhole temperature of the subterranean formation of from about 250° F. to about 255° F., in other embodiments, about 255° F. to about 260° F., in other embodiments, about 260° F. to about 265° F., in other embodiments, about 265° F. to about 270° F., in other embodiments, about 270° F. to about 275° F., in other embodiments, about 275° F. to about 280° F., in other embodiments, about 280° F. to about 285° F., in other embodiments, about 285° F. to about 290° F., in other embodiments, about 290° F. to about 295° F., in other embodiments, about 295° F. to about 300° F., in other embodiments, about 300° F. to about 305° F., in other embodiments, about 305° F. to about 310° F., in other embodiments, about 310° F. to about 315° F., in other embodiments, about 315° F. to about 320° F., in other embodiments, about 320° F. to about 325° F., in other embodiments, about 325° F. to about 330° F., in other embodiments, about 330° F. to about 335° F., in other embodiments, about 335° F. to about 340° F., in other embodiments, about 340° F. to about 345° F., and in other embodiments, about 345° F. to about 350° F. In certain embodiments, degradation of the water swellable agent may occur at a downhole temperature of the subterranean formation around about 250° F.

In certain embodiments, the time period over which degradation of the water swellable agent occurs may vary depending on the downhole temperature of the subterranean formation. In certain embodiments, the rate at which degradation of the water swellable agent occurs may increase as the downhole temperatures of the subterranean formation increases. In certain embodiments, degradation of the water swellable agent of the present disclosure may occur over a time period of from about 24 hours to about 72 hours. In other embodiments, the degradation of the water swellable agent of the present disclosure may occur over a time period of from about 24 hours to about 36 hours, in other embodiments, about 36 hours to about 48 hours, in other embodiments, about 48 hours to about 60 hours, and in other embodiments, about 60 hours to about 72 hours. In some embodiments, degradation of the water swellable agent of the present disclosure may occur over a time period of greater than 72 hours. In other embodiments, degradation of the water swellable agent of the present disclosure may occur over a time period of less than 24 hours. In certain embodiments, a gel stabilizer may be combined with the water swellable agent before being introduced into the subterranean formation to delay the degradation of the water swellable agent. One example of a suitable commercially available gel stabilizer is Gel-Sta™, available from Halliburton Energy Services, Inc., Houston, Tex.

According to some embodiments, the water swellable agent may be combined with a carrier fluid to form a carrier solution before being introduced into a subterranean formation. In certain embodiments, the carrier fluid may be used to introduce the water swellable agent into or adjacent to a permeable zone of the subterranean formation using one or more pumps. The carrier fluids that may be useful in accordance with the present disclosure may be any suitable carrier fluid that does not cause the water swellable agent to swell prematurely (or at all) or that inhibits the rate at which the water swellable agent swells. The carrier fluid may be any suitable fluid for moving the water swellable agent to desired locations in the subterranean formation. Examples of carrier fluids with which the water swellable agent may be combined include, but are not limited to, fresh water, deionized water, brine water of varying salinity, chloride solutions (e.g., calcium dichloride solution or potassium chloride solutions), hydrocarbons (e.g., produced oil and diesel oil), hydrocarbon based fluids, and synthetic fluids (e.g., ester or polymer based fluids).

In certain embodiments, an aqueous carrier fluid may be used to introduce the water swellable agent into or adjacent to a permeable zone of the subterranean formation. In such embodiments, the water swellable agent may be introduced into the aqueous carrier fluid as the aqueous carrier fluid is being pumped into the well bore to prevent premature swelling of the water swellable agent. In certain embodiments, the aqueous carrier fluid may be of the type that inhibits the swelling of the water swellable agent (e.g., calcium chloride brines). In certain embodiments, the salinity of the aqueous carrier may be increased to reduce the rate at which the water swellable agent swells. In certain embodiments, the aqueous carrier fluid may contain an acid to reduce the rate at which the water swellable agent swells. In other embodiments, a non-aqueous carrier fluid may be used to introduce the water swellable agent into or adjacent to a permeable zone of the subterranean formation. In such embodiments, the water swellable agent will not swell in the non-aqueous carrier fluid so the water swellable agent may be combined with the carrier fluid to form a carrier solution before being introduced into the well bore.

As would be appreciated by those of ordinary skill in the art with the benefit of this disclosure, the effective amount of water swellable agent may vary depending on factors such as the type of the carrier fluid, the size of a fracture, fissure, etc., and the like. In certain embodiments, the carrier fluid may comprise the water swellable agent in an amount from about 0.05 to about 0.5 pounds water swellable agent/gallon carrier fluid (ppg). In other embodiments, the carrier fluid may contain water swellable agent in an amount from about 0.05 ppg to about 0.1 ppg, in other embodiments, about 0.1 ppg to about 0.15 ppg, in other embodiments, about 0.15 ppg to about 0.2 ppg, in other embodiments, about 0.2 ppg to about 0.25 ppg, in other embodiments, about 0.25 ppg to about 0.3 ppg, in other embodiments, about 0.3 ppg to about 0.35 ppg, in other embodiments, about 0.35 ppg to about 0.4 ppg, in other embodiments, about 0.4 ppg to about 0.45 ppg, and in other embodiments, about 0.45 ppg to about 0.5 ppg. In certain embodiments, the carrier fluid containing carrying the water swellable agent may remain sufficiently non-viscous in order to allow it to be placed in the permeable areas of the subterranean formation. Thus, there may be no need to apply higher pressure that could damage the rock structure surrounding the subterranean in an attempt to force the water swellable agent into the permeable areas.

In certain embodiments, an aqueous solution may be introduced into the subterranean formation to contact the water swellable agent and to cause the water swellable agent to swell. The aqueous solutions used to swell the swellable agent in accordance with the present disclosure may comprise water from any source. Such aqueous solutions may comprise fresh water, salt water (e.g., water containing one or more salts dissolved therein), brine (e.g., saturated salt water), seawater, or any combination thereof In certain embodiments, the aqueous solution may comprise one or more ionic species, such as those formed by salts dissolved in water. For example, seawater and/or produced water may comprise a variety of divalent cationic species dissolved therein.

In certain embodiments, the amount of aqueous solution introduced into the subterraneous may be an effective amount for swelling the water swellable agent to completely plug or partially plug the permeable zone. In certain embodiments, the aqueous solution may comprise at least a portion of the carrier fluid used to introduce the water swellable agent into or adjacent to a permeable zone of the subterranean formation. In such embodiments, the water swellable agent may be introduced into the aqueous solution as the aqueous solution is being pumped into the well bore to prevent premature swelling of the water swellable agent. In certain embodiments, the aqueous solution may be introduced into the subterranean formation before the water swellable agent is introduced to contact the aqueous solution.

In certain embodiments, a treatment fluid may be introduced into the subterranean formation and diverted by the water swellable agent of the present disclosure. The treatment fluids that may be useful in accordance with the present disclosure may be used to carry out a variety of subterranean treatments, including but not limited to, hydraulic fracturing treatments, acidizing treatments, and drilling operations. The treatment fluids of the present disclosure may be used in treating a portion of a subterranean formation, for example, in acidizing treatments such as matrix acidizing or fracture acidizing. Acidizing and fracturing procedures using acidic treatment fluids may be carried out in subterranean formations to accomplish a number of purposes including, but not limited to, to facilitate the recovery of desirable hydrocarbons from the formation.

Depending on the type of treatment to be performed, the treatment fluid may comprise any treatment fluid known in the art. Treatment fluids that may be useful in accordance with the present disclosure include, but are not limited to, fracturing fluids, gravel packing fluids, pre-pad fluids, pad fluids, preflush fluids, afterflush fluids, acidic fluids, consolidation fluids, cementing fluids, well bore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that comprises a gas), gels, emulsions, gases, and the like.

The treatment fluids that may be useful in accordance with the present disclosure may comprise any base fluid known in the art, including, but not limited to, aqueous fluids, non-aqueous fluids, and any combinations thereof. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art with the benefit of this disclosure will recognize when such density and/or pH adjustments are appropriate. Examples of non-aqueous fluids that may be suitable for use in the methods of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like.

In certain embodiments, the treatment fluids and/or carrier fluids used in the methods of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art with the benefit of this disclosure will recognize the types of additives that may be included in the fluids of the present disclosure for a particular application.

In certain embodiments, the treatment fluid may be an acidic treatment fluid. Any known acidic treatment fluid used for acidizing operations in a subterranean formation may be used. In certain embodiments, the acidic treatment fluid may comprise hydrochloric acid. In certain embodiments, the acidic treatment fluid may include one treatment fluid selected from the group consisting of: hydrofluoric acid, acetic acid, formic acid, citric acid, ethylene diamine tetra acetic acid ("EDTA"), glycolic acid, sulfamic acid, and derivatives or combinations thereof. In certain embodiments, the introduction of the acidic treatment fluid may be carried out at or above a pressure sufficient to create or enhance one or more fractures within the subterranean formation (e.g., fracture acidizing). In other embodiments, the introduction of the acidic treatment fluid may be carried out at a pressure below that which would create or enhance one or more fractures within the subterranean formation (e.g., matrix acidizing).

FIG. 1 shows a side view of a subterranean formation penetrated by a well bore with a casing string 10 placed in the well bore. The well bore penetrates two zones 20 and 30 in the subterranean formation, wherein the fluid flow resistance of zone 20 is higher than the fluid flow resistance of zone 30. Perforations 12, 14 have been created in the casing string 10 to allow for fluid flow into the zones 20 and 30. In certain embodiments, a carrier fluid containing a water swellable agent of the present disclosure may be introduced into at least a portion of the perforations 14 within zone 30 or adjacent to a least a portion of zone 30 of the subterranean formation using one or more pumps. Once the water swellable agent is introduced into the subterranean formation, an aqueous solution may be introduced into the subterranean formation to contact the water swellable agent. In certain embodiments, the introduction of the water swellable agent and the introduction of the aqueous solution may be reversed such that the aqueous solution is first introduced into at least a portion of zone 30 followed by the water swellable agent. In other embodiments, the aqueous solution may be the carrier fluid such that the water swellable agent and the aqueous solution are introduced into at least a portion of zone 30 simultaneously.

Once introduced into the well bore, the water swellable agent may absorb the aqueous solution and swell to form a gel mass 18 to plug or partially plug zone 30. An acidic treatment fluid 16 may then be introduced into the well bore and diverted by gel mass 18 to the less permeable zone 20 of the subterranean formation. The acidic treatment fluid 16 may be allowed to interact with the less permeable zone 20 of the subterranean formation so as to create one or more voids in the formation.

After diverting the treatment fluid, gel mass 18 may degrade over time at a naturally occurring downhole temperature of the subtenanean formation of from about 250° F. to about 350° F. to at least partially unplug zone 30 without having to perform secondary cleanup operations to remove the water swellable agent from the permeable zone. In another embodiment, this diverting procedure may be repeated with respect to each of a second, third, fourth, or more, treatment stages to divert the treatment fluid to further less permeable zones of the subterranean formation.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

The following example demonstrates the degradability of a water swellable agent, CrystalSeal® polymer, over time at various temperatures. One gram of 4 mm CrystalSeal® particulates was swollen with 100 mL of tap water to form a gel mass. As shown in Table 1, 100% of the CrystalSeal® polymer degraded within 24 hours after being heated to 300°

F. As also shown in Table 1, 100% of the CrystalSeal® polymer degraded within 72 hours after being heated to 250° F. As also shown in Table 1, 0% of the CrystalSeal® polymer degraded within 72 hours after being heated to 250° F. when a gel stabilizer was combined with the CrystalSeal® polymer. Thus, incorporation of a gel stabilizer may delay the degradation of the CrystalSeal® polymer.

TABLE 1

| Tap Water (mL) | CrystalSeal ® Particulate Size (mm) | CrystalSeal ® Particulate Weight (grams) | Temperature (° F.) | Time (hours) | Degradation (%) |
|---|---|---|---|---|---|
| 100 | 4 | 1 | 300 | 24 | 100 |
| 100 | 4 | 1 | 250 | 72 | 100 |
| 100 | 4 | 1 | 250 | 72 | 0* |
| 100 | 1 | 1 | 225 | 96 | 0 |

*Solution contained a gel stabilizer (5 lb/Mgal Gel-Sta ™)

Thus, Example 1 demonstrates that the methods of the present disclosure may provide, among other benefits, a water swellable agent that may degrade under natural conditions of a subterranean formation thus reducing or eliminating the need for performing secondary cleanup operations to recover or to otherwise remove the water swellable agent from the subterranean formation.

An embodiment of the present disclosure is a method comprising: introducing a water swellable agent into or adjacent to a permeable zone of a subterranean formation; introducing an aqueous solution into the subterranean formation to contact the water swellable agent; allowing the water swellable agent to swell when contacted by the aqueous solution; introducing a treatment fluid into the subterranean formation, wherein the water swellable agent diverts the treatment fluid away from the permeable zone; and allowing the water swellable agent to thermally degrade.

Another embodiment of the present disclosure is a method comprising: introducing a water swellable agent into or adjacent to a permeable zone of a subterranean formation, wherein the subterranean formation has a downhole temperature of from about 250° F. to about 350° F.; introducing an aqueous solution into the subterranean formation to contact the water swellable agent; allowing the water swellable agent to swell when contacted by the aqueous solution; introducing a treatment fluid into the subterranean formation, wherein the water swellable agent diverts the treatment fluid away from the permeable zone; and allowing the water swellable agent to thermally degrade, thereby removing the water swellable agent from the permeable zone.

Another embodiment of the present disclosure is a method comprising: introducing a water swellable agent into or adjacent to a permeable zone of a subterranean formation, wherein the subterranean formation has a downhole temperature of from about 250° F. to about 350° F.; introducing an aqueous solution into the subterranean formation to contact the water swellable agent; allowing the water swellable agent to swell when contacted by the aqueous solution; introducing a treatment fluid comprising an acid into the subterranean formation, wherein the water swellable agent diverts the treatment fluid away from the permeable zone; and allowing the water swellable agent to thermally degrade, thereby removing the water swellable agent from the permeable zone without performing a secondary cleanup operation in the permeable zone.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a water swellable agent into or adjacent to a permeable zone of a subterranean formation wherein the water swellable agent is a crystalline polymer, wherein the crystalline polymer is a crosslinked polyacrylamide;
   introducing an aqueous solution into the subterranean formation to contact the water swellable agent;
   allowing the water swellable agent to swell when contacted by the aqueous solution;
   introducing a treatment fluid into the subterranean formation, wherein the water swellable agent diverts the treatment fluid away from the permeable zone; and
   allowing the water swellable agent to thermally degrade at a temperature of at least 250° F., thereby removing the water swellable agent from the permeable zone without performing a secondary cleanup operation in the permeable zone.

2. The method of claim 1 wherein the particle size of the water swellable agent is from about 0.04 mm to about 4 mm.

3. The method of claim 1 wherein the water swellable agent swells when contacted by the aqueous solution to form a gel mass that blocks the flow of the treatment fluid through the permeable zone.

4. The method of claim 1 further comprising combining the water swellable agent with a carrier fluid before introducing the water swellable agent into or adjacent to the permeable zone of the subterranean formation.

5. The method of claim 4 wherein the carrier fluid is selected from the group consisting of: fresh water, brine, a potassium chloride solution, a calcium chloride solution, a hydrocarbon, a synthetic fluid, and combinations thereof.

6. The method of claim 4 wherein the water swellable agent is present in the carrier fluid in an amount ranging from about 0.05 to about 0.5 pounds of water swellable agent per gallon of carrier fluid.

7. The method of claim 4 wherein the aqueous solution comprises at least a portion of the carrier fluid.

8. The method of claim 4 wherein the carrier fluid containing the water swellable agent is introduced into the subterranean formation using one or more pumps.

9. The method of claim 1 further comprising combining a gel stabilizer with the water swellable agent before introducing the water swellable agent into or adjacent to the permeable zone.

10. The method of claim 1 wherein the subterranean formation has a downhole temperature of from about 250° F. to about 350° F.

11. The method of claim 1 wherein the treatment fluid is selected from the group consisting of: a fracturing fluid, a gravel packing fluid, a pre-pad fluid, a pad fluid, a pre-flush fluid, an after-flush fluid, an acidic fluid, a consolidation fluid, a cementing fluid, a well bore clean-out fluid, a conformance fluid, an aqueous fluids, a non-aqueous fluids, a hydrocarbon-based fluid, a foamed fluid, and any combinations thereof.

* * * * *